Jan. 8, 1957 W. L. WEEKS 2,776,520
MECHANICAL INSECT KILLING DEVICE
Filed Feb. 14, 1955 2 Sheets-Sheet 2
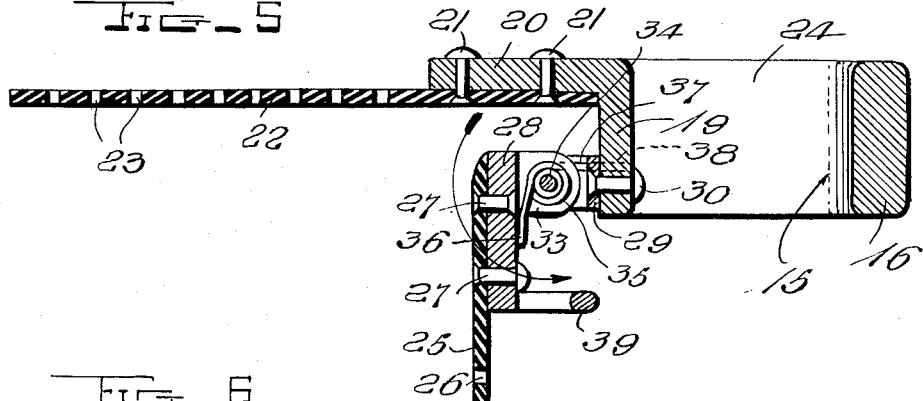
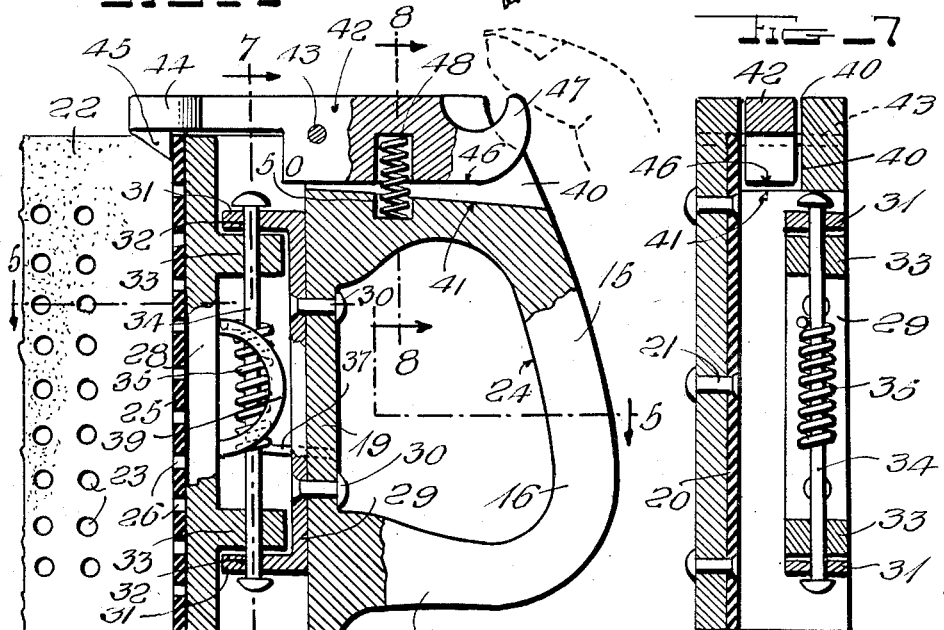
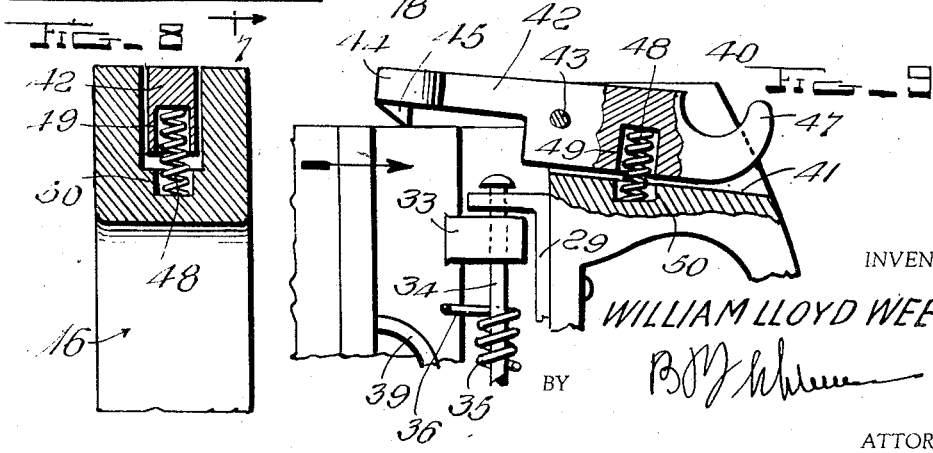
INVENTOR
WILLIAM LLOYD WEEKS,
BY
ATTORNEY

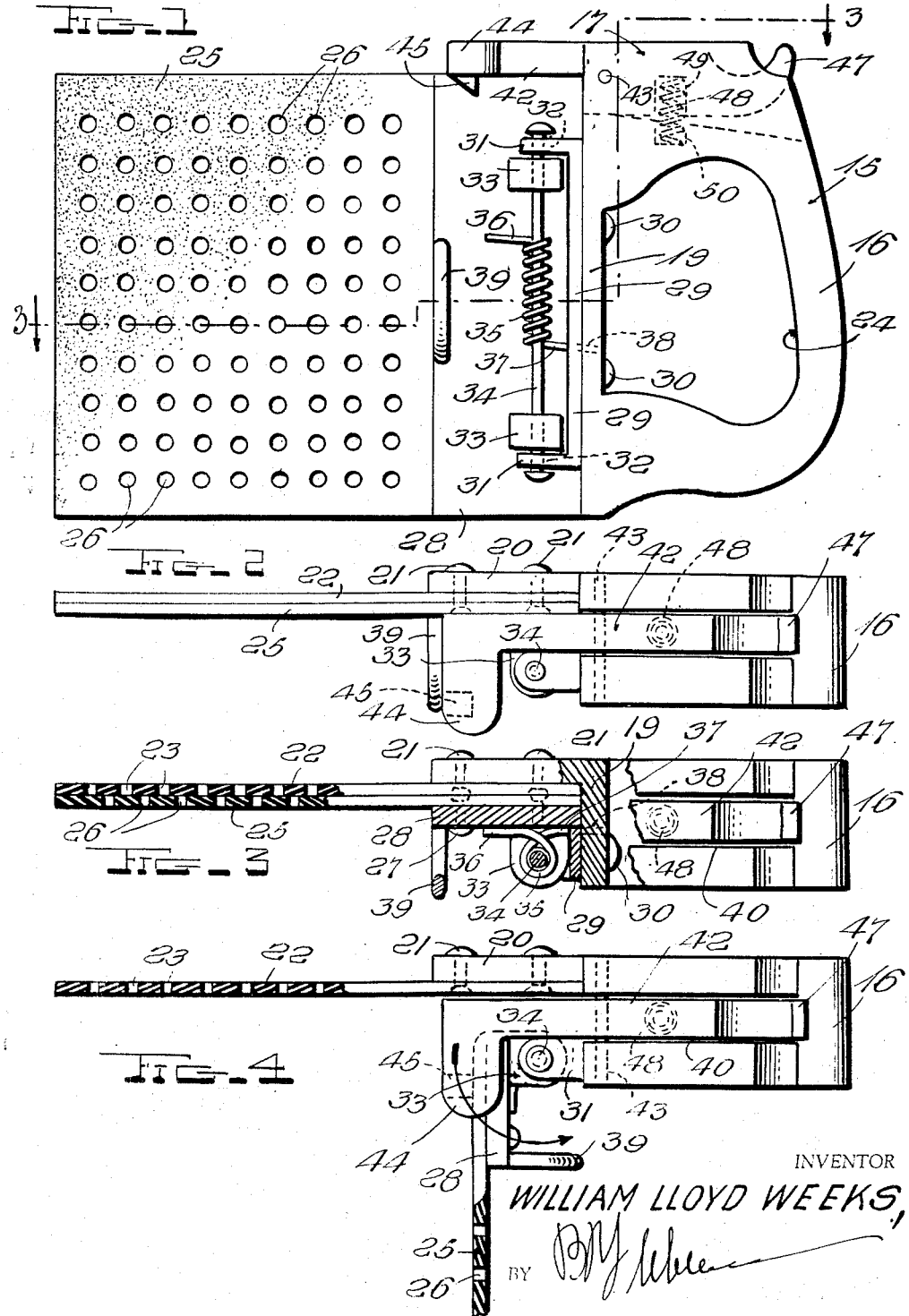

United States Patent Office 2,776,520
Patented Jan. 8, 1957

2,776,520

MECHANICAL INSECT KILLING DEVICE

William Lloyd Weeks, Florence, S. C.

Application February 14, 1955, Serial No. 487,768

5 Claims. (Cl. 43—135)

My invention relates to a mechanical device for killing flies and other winged insects.

An object of the invention is to provide a mechanical fly killer which is operable to kill the fly in flight or when the fly is at rest.

A further object of the invention is to provide a device of the above-mentioned character which is highly simplified and economical in construction, the device being well adapted to be made from modern light weight plastics materials, or the like.

Another object of the invention is to provide in a device of the above-mentioned character a novel trigger release mechanism to be operated by the thumb of one hand for placing the device in operation.

Other objects and advantages of the invention will be apparent during the course of the following description.

In the accompanying drawings, forming a part of this application, and in which like numerals are employed to designate like parts throughout the same.

Figure 1 is a side elevation of a fly killer in accordance with the present invention, Figure 2 is a plan view of the same, Figure 3 is a horizontal cross section taken on line 3—3 of Figure 1, parts in elevation, Figure 4 is a further plan view of the device in the cocked position for slapping the fly, parts broken away and parts in section, Figure 5 is a horizontal section taken on line 5—5 of Figure 6, Figure 6 is a fragmentary side elevation of the device as shown in Figure 4, with parts in section, Figure 7 is a vertical section taken on line 7—7 of Figure 6, Figure 8 is an enlarged vertical section taken on line 8—8 of Figure 6, and, Figure 9 is a fragmentary elevational view of the device showing the position of the trigger and movable slapper just prior to cocking the device.

In the drawings, where for the purpose of illustration is shown a preferred embodiment of the invention, the numeral 15 designates generally a hand grip for the device which may be generally D-shaped, as shown, and including a generally vertical bar portion 16 and top and bottom forwardly projecting horizontal portions 17 and 18. The forward ends of the hand grip portions 17 and 18 are preferably integrally connected by a vertical bar or member 19, provided at one side of the hand grip 15 with a forwardly projecting flange or extension 20, rigidly secured thereto, and preferably integral therewith. The members 19 and 20 thus constitute a forward side or bar of the hand grip which is L-shaped in horizontal cross section, as best shown in Figure 5. The hand grip 15 is well adapted to be cast or molded from light weight plastics material, or the like, although it may be formed of wood, light metal, or the like, if preferred.

Fixedly secured to the inner face of the rigid flange 20, by means of rivets 21 or the like is a relatively stationary slapper or sheet 22. The slapper 22 is rectangular, and projects forwardly of the hand grip 15 and flange 20 for a substantial distance, as shown, and also for the entire length or height of the flange 20, as shown. The slapper 22 is preferably formed from a relatively thick sheet of semi-flexible plastics material, or the like, although it may be formed of substantially stiff material if preferred. If desired, the slapper 22 may be formed integral with the flange 20, in which case the rivets 21 may be dispensed with.

As shown in the drawings, the slapper 22 is provided with a multiplicity of uniformly spaced apertures 23, extending therethrough, and preferably arranged in equidistantly spaced rows longitudinally and transversely of the slapper 22. The purpose of the apertures 23 is to afford decreased air resistance to the device during its operation, as will become more apparent hereinafter. Although the slapper 22 is shown and described as rectangular, it should, of course, be understood that the same may be formed in any other desired shape, if preferred.

The hand grip 15 may have generally the shape of a conventional saw handle, as shown in the drawings, although the precise shape of the hand grip is not critical and may be modified somewhat as found desirable. As shown in the drawings, the hand grip has a generally central opening 24 formed therethrough for the fingers.

A companion relatively movable slapper 25 is provided, and preferably formed of the same semi-flexible material as the relatively stationary slapper 22. The movable slapper 25 is of the same shape as and substantially coextensive with the slapper 22, so that the two slappers may be arranged in superposed contacting relation as shown in Figures 2 to 4. The movable slapper 25 is likewise provided with a multiplicity of apertures 26, extending therethrough, and arranged in rows which are staggered or out of registration with the rows of apertures 23, Figure 3.

The movable slapper 25 has its rear end portion fixedly secured by means of rivets 27 or the like to a horizontally swingable vertically disposed rigid plate or bar 28, disposed opposite the flange 20 and movable in an arc toward and from the same. If desired, the slapper 25 may be molded or formed integral with the plate 28, in which case the rivets 27 may be dispensed with.

A bracket 29 is mounted upon the forward face of the bar 19 and extends longitudinally thereof, adjacent the edge of the bar 19 remote from the flange 20. The bracket 29 is rigidly secured to the bar 19 by rivets 30 or the like. If preferred, the bracket 29 may be formed integral with the bar 19. The bracket 29 carries a pair of forwardly projecting vertically spaced opposed extensions 31 having apertures 32 which are in axial alignment. Apertured lugs or knuckles 33 are integrally formed upon the outer side of the plate 28 and arranged adjacent the inner sides of the extensions 31, as shown. A vertical pivot pin 34 extends through the apertures of the extensions 31 and knuckles 33, and serves to pivotally secure the plate 28 and slapper 25 to the bracket 29 and hand grip.

A strong torsional coil spring 35 surrounds the pivot pin 34, inwardly of the knuckles 33, and has one generally radial end 36 bearing against the outer side of the plate 28 for urging the same and the slapper 25 toward the relatively stationary slapper 22. An opposite generally radial end 37 of the spring 35 is anchored within an opening 38, formed through the bracket 29 and bar 19, as shown. The arrangement is such that the spring 25 normally holds the movable slapper 25 in parallel superposed contacting relation with the relatively stationary slapper 22. A U-shaped finger engaging member or loop 39 is rigidly secured to the outer side of the plate 28, adjacent its forward longitudinal edge and preferably at its longitudinal center and extending at right angles thereto. The loop 39 is grasped by the finger or fingers of the left hand while the hand grip 15 is held in the right hand for swinging the movable slapper 25 to the retracted or cocked position, wherein it is arranged at right angles to the slapper 22, as shown in Figures 4 and 5.

Means are provided to releasably latch the pivoted slapper 25 in the retracted or cocked position of Figure 5. The hand grip portion 17 is provided in its top with a longitudinal passage or slot 40, having a rearwardly and downwardly inclined bottom wall 41, as shown. The slot 40 opens through the forward and rear ends of the hand grip portion 17. A combined latch and trigger lever 42 is arranged within the slot 40 and extends longitudinally therethrough, and is pivoted to the hand grip portion 17 by a transverse pin 43 or the like. As best shown in Figure 2, the lever 42 projects forwardly of the bar 19 and is arranged just above the top edges of the slappers 22 and 25. At its forward end, the lever 42 carries a transverse extension 44, integral therewith, and directed away from the vertical flange 20, Figure 2. On the lower side of the lateral extension 44, and adjacent its forward edge is a downwardly and rearwardly inclined or beveled latch element or detent 45, rigidly secured to the extension 44, and preferably formed integral therewith. This detent 45 extends below the upper longitudinal edges of the slappers 22 and 25 and below the upper edge of the plate 28, Figure 1. The portion of the lever 42 within the slot 40 has its bottom horizontal edge 46 arranged close to the inclined bottom 41 of the slot 40, Figure 6, although normally spaced somewhat therefrom, as shown. The lever extension 44 is upwardly offset with respect to the portion of the lever 42 in the slot 40, as shown in Figure 6. The rear end of the lever 42 is provided with an upwardly curved trigger extension 47 to be operated by the thumb of the hand grasping the hand grip 15. The trigger extension 47 preferably projects slightly rearwardly of the hand grip portion 16 and terminates near the top of the hand grip portion 17, as shown.

The lever 42 is normally held in the horizontal position of Figures 1 and 6 by a compressible coil spring 48, having its ends arranged in companion recesses 49 and 50, formed respectively in the bottom of the lever 42 and bottom wall 41 of the slot. The spring 48 is arranged rearwardly of the pivot pin 43, and thus serves to elevate the rear trigger extension 47 and depress or lower the extension 44 and beveled detent 45. When the trigger extension 47 is depressed with the thumb, the lower edge 46 of the lever is shifted downwardly into parallel relation with the bottom 41 of the slot 40, and the beveled detent 45 is elevated clear of the upper edge of the plate 28.

In operation, the user of the device may hold the hand grip 15 in the right hand so that the thumb of this hand is in position to engage the trigger extension 47. A finger of the left hand may be used to grasp the loop 39 and swing the movable slapper 25 and plate 28 horizontally about the pin 34 to positions at right angles to the flange 20 and slapper 22, Figures 4 and 5. When this is done, the upper edge of the plate 28 will engage the beveled face of the detent 45, and the detent will be elevated and will ride over the upper edges of the plate 28 and slapper 25, in the manner shown in Figure 9. The lever 42 will pivot automatically upon its pin 43 and against the action of the spring 48 to permit this. After the detent 45 rides over the top edges of the plate 28 and slapper 25, the spring 48 will cause it to drop in front of the inner face of the slapper 25 as best shown in Figure 6. The slapper 25 is now locked in the retracted or cocked position, at right angles to the slapper 22.

When the operator of the device sights a fly or other insect in flight, he merely depresses the trigger extension with the thumb, and this elevates the detent 45 clear of the upper edges of the slapper 25 and plate 28, and the strong spring 35 immediately swings the slapper 25 toward the stationary slapper 22. The slapper 25 strikes or slaps the slapper 22 and is arranged in superposed contacting relation therewith, and the fly or other insect is caught between the two slappers and killed.

The device may also be used to kill flies which have lighted on some object, by bringing the cocked device into near proximity with the fly which will disturb it and cause it to take off. As soon as this occurs, the trigger 47 is depressed, and the slapper 25 springs against the stationary slapper 22, killing the fly. As previously mentioned, the apertures 23 and 26 of the slappers lessen the air resistance to the operation of the device and render the same quicker and more effective in operation.

When the slappers 22 and 25 are arranged in normally closed parallel contacting relation as in Figure 2, the device may be utilized as an ordinary fly swatter, if desired.

It is to be understood that the form of the invention, herewith shown and described is to be taken as a preferred example of the same, and that various changes in the shape, size and arrangement of parts may be resorted to, without departing from the spirit of the invention or scope of the subjoined claims.

Having thus described my invention, I claim:

1. A mechanical insect killing device comprising a handle body portion, a relatively stationary slapper secured to the handle body portion and extending forwardly thereof substantially in the same plane as said body portion, a movable slapper hingedly secured to the handle body portion adjacent the inner end of said stationary slapper and having its hinge axis parallel to said plane, said movable slapper adapted to extend forwardly of the handle body portion in opposed substantially contacting parallel relation to said stationary slapper and handle body portion, the movable slapper being swingable laterally about said hinge axis to a position generally at right angles to the handle body portion and stationary slapper, movable latch means carried by the handle body portion and engageable with said movable slapper when the same is positioned at right angles to the handle body portion for releasably holding the movable slapper in such extended position, and a spring connected with the movable slapper for returning it rapidly to opposed parallel contacting relation with said stationary slapper when said latch means is actuated to disengage the movable slapper.

2. A mechanical insect killing device comprising a handle body portion, a relatively stationary slapper secured to the handle body portion and extending forwardly thereof substantially in the same plane as said body portion, hinge means connected with the handle body portion near the inner end of said stationary slapper and having a hinge axis disposed substantially in the plane of said handle body portion and stationary slapper, a movable slapper substantially coextensive in area with the stationary slapper connected with the hinge means and swingable about the axis of the hinge means to a position generally at right angles to the handle body portion and stationary slapper, the movable slapper being adapted to extend forwardly of the handle body portion in opposed parallel substantially contacting relation with the stationary slapper, a pivoted latch element secured to the handle body portion and engageable with the movable slapper when the latter is substantially at right angles to the stationary slapper to releasably hold the movable slapper in such extended position, and a spring connected with the movable slapper to return the same to parallel contacting relation with the stationary slapper when said latch element is actuated to release the movable slapper.

3. A mechanical insect killing device comprising a handle body portion having a forward coplaner extension, a somewhat flexible relatively stationary slapper secured to said extension and projecting forwardly thereof in substantially the plane of the extension and handle body portion, a plate element arranged forwardly of the handle body portion in opposed relation to said extension, hinge means connecting said plate element with the handle body portion adjacent the forward end of the latter so that the plate element may be swung laterally of the handle body portion and extension to a position substantially at right angles to the extension, a somewhat flexible movable slapper secured to the plate element and being generally coextensive with said stationary slapper and adapted to contact the same when the plate element is in parallel opposed relation to the extension, resilient means connected with the plate element to maintain it in parallel opposed relation to said extension, and a movable latch device carried by said handle body portion and engageable with the plate element when the plate element is substantially at right angles to said extension for releasably holding plate element with the movable slapper in such position.

4. A mechanical insect killing device according to claim 3, and an element secured to one side of said plate element to be grasped by the operator for shifting the plate element and movable slapper to a position substantially at right angles to said extension and handle body portion.

5. A mechanical insect killing device according to claim 3, wherein said handle body portion is provided in its top with a slot and said movable latch device is a lever pivoted within said slot and having a beveled detent part to be engaged by said plate element when the latter is shifted to a position substantially at right angles to said extension.

References Cited in the file of this patent

UNITED STATES PATENTS

| | | |
|---|---|---|
| 1,169,227 | Anderson | Jan. 25, 1916 |
| 1,457,674 | Kennedy et al. | June 5, 1923 |